Patented Nov. 25, 1941

2,263,664

UNITED STATES PATENT OFFICE 2,263,664

MINERAL OIL COMPOSITION

Jones I. Wasson, Union, and Warren M. Smith, Elizabeth, N. J., assignors to Standard Oil Development Company, a corporation of Delaware No Drawing. Application January 25, 1940, Serial No. 315,521

8 Claims. (Cl. 252—52)

The present invention relates to an improved mineral oil composition. The invention is more particularly concerned with a petroleum oil composition comprising a relatively small amount of a substance selected from the class of tertiary alkyl aromatic mono-ethers which are characterized by having at least two alkyl groups attached directly to the aromatic nucleus, one of which is a tertiary alkyl group and the other of which is an alkyl group containing at least two carbon atoms in the molecule.

It is well known in the art to improve the general quality and particular characteristics of mineral oils, particularly petroleum oils, by adding thereto various organic inhibiting agents. These materials serve to increase the ability of the oil to withstand operating conditions under which the oil would normally fail in a relatively short time period. We have now discovered a class of substances which are particularly desirable for use as addition agents for petroleum oils. Our materials serve to produce an oil blend of unexpected stability which will not deteriorate under most severe operating temperatures and pressures. The inhibiting agents of our invention are tertiary alkyl aromatic mono-ethers which are characterized by having at least two alkyl groups attached directly to the aromatic nucleus, one of which is a tertiary alkyl group and the other of which is an alkyl group containing at least two carbon atoms in the molecule. These materials may be represented by the following structural formula:

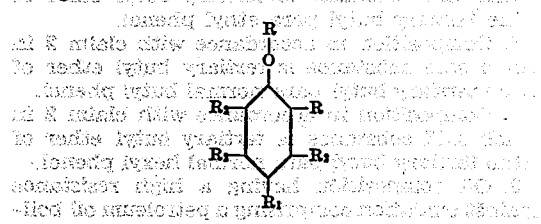

in which "R" represents a tertiary alkyl group, "R1" represents an alkyl group containing at least two carbon atoms in the molecule, and "R2" represents hydrogen or additional alkyl groups. Preferred substances are those in which the tertiary alkyl group attached directly to the aromatic nucleus is in the ortho position and the alkyl group having at least two carbon atoms in the molecule is in the para position with respect to the ether linkage. Materials of this class are, for example, tertiary butyl ether of ortho tertiary butyl para isopropyl phenol, tertiary amyl ether of ortho tertiary amyl para isopropyl phenol, tertiary amyl ether of ortho tertiary butyl para isopropyl phenol, tertiary hexyl ether of ortho tertiary hexyl para isopropyl phenol, tertiary butyl ether of ortho tertiary butyl para isobutyl phenol, tertiary butyl ether of ortho tertiary butyl para ethyl phenol, tertiary butyl ether of ortho tertiary butyl para normal butyl phenol, tertiary butyl ether of ortho tertiary butyl para normal hexyl phenol, and the like. Particularly desirable inhibitors are those in which the tertiary alkyl group attached to the ether linkage contains from four to five carbon atoms in the molecule, examples of which are tertiary butyl ether of ortho tertiary butyl para isopropyl phenol, tertiary butyl ether of ortho tertiary butyl para ethyl phenol, and tertiary amyl ether of ortho tertiary butyl para ethyl phenol. It is also desirable that both alkyl groups attached directly to the aromatic nucleus contain from four to five carbon atoms in the molecule.

These materials may be used to improve the quality of any mineral, animal, or vegetable oils, but are particularly desirable for use in petroleum oils which are employed under severe operating conditions of elevated temperatures and pressures. The quantity of inhibitor used will vary considerably, depending upon the particular inhibitor employed, the character of the base oil, as well as upon the conditions under which the oil is to be used. The quantity of inhibitor used may vary in the range from 0.01% to as high as 3%. However, in general, it is preferred to use from 0.05% to 1.0% of the inhibitor.

In order to further illustrate the invention, the following example is given which should not be construed as limiting the invention in any manner whatsoever:

Example

A petroleum turbine oil of the following inspections:

| | |
|---|---|
| Gravity | 33.5° A. P. I. |
| Flash | 425° F. |
| Saybolt Universal vis./100° F. | 155 |
| Robinson color | 17 | was blended with 0.1% of various substances and the blend then tested in order to determine the susceptibility of the blend toward oxidation and deterioration. The oxidation tendency of the oil was measured by the Staeger oxidation test.* The results of these tests were as follows:

|  | Hours 0 | | Hours 100 | | Hours 200 | | Hours 300 | | Hours 450 | |
|---|---|---|---|---|---|---|---|---|---|---|
|  | Color | Neut. No. | Color | Neut. No. | Color | Neut. No. | Color | Neut. No. | Color | Neut. No. |
| Turbine oil | 17 | 0.03 | 5 | 0.30 |  |  | Black |  |  |  |
| Turbine oil+0.1% tertiary butyl ether of o-tertiary butyl p-isopropyl phenol | 17 | 0.03 | 17 | 0.03 |  |  | 15 | 0.03 | 12 | 0.03 |
| Turbine oil+tertiary butyl ether of ortho tertiary butyl para ethyl phenol | 17 | 0.03 | 17 | 0.03 |  |  | 15 | 0.03 | 12 | 0.03 |
| Turbine oil+tertiary butyl ether of ortho tertiary butyl para normal butyl phenol | 17 | 0.03 | 17 | 0.03 |  |  | 15 | 0.03 | 12 | 0.03 |
| Turbine oil+tertiary butyl ether of ortho tertiary butyl para normal hexyl phenol | 17 | 0.03 | 17 | 0.03 |  |  | 12 | 0.05 | 5 | 0.30 |

*Staeger oxidation test: 200 ccs. of oil are placed in a 400 ccs. beaker and maintained at a temperature of 110° C. in the presence of a metallic copper catalyst for various time periods. The color of the oil is observed and the product neutralized in order to determine the quantity of acidic materials formed. The color was measured by the Tag Robinson colorimeter. The neutralization number is equivalent to milligrams of potassium hydroxide per gram of oil.

From the above data it is clearly apparent that the compounds of the present invention materially improved the quality of the petroleum oil to which they were added.

Further tests were conducted with the following results:

|  | Hours 0 | | Hours 100 | | Hours 200 | |
|---|---|---|---|---|---|---|
|  | Color | Neut. No. | Color | Neut. No. | Color | Neut. No. |
| Turbine oil+o-tertiary butyl para isopropyl phenol | 17 | 0.03 | 9.5 | 0.1 | 5 | 0.35 |
| Turbine oil+o-tertiary butyl para ethyl phenol | 17 | 0.03 | 6 | 0.14 | 3 | 0.45 |
| Turbine oil+o-tertiary butyl para normal butyl phenol | 17 | 0.03 | 7 | 0.12 | 4 | 0.40 |
| Turbine oil+o-tertiary butyl para normal hexyl phenol | 17 | 0.03 | 10 | 0.12 | 6 | 0.30 |

From the above it is apparent that the corresponding phenols are ineffective.

Additional tests were run using related substances not within the scope of the present invention with the following results:

|  | Hours 0 | | Hours 100 | | Hours 200 | |
|---|---|---|---|---|---|---|
|  | Color | Neut. No. | Color | Neut. No. | Color | Neut. No. |
| Turbine oil+0.1% methyl ether of ortho tertiary butyl para cresol | 17 | 0.03 | 5 | 0.30 |  |  |
| Turbine oil+0.1% of ethyl ether of ortho tertiary butyl para cresol | 17 | 0.03 | 7 | 0.20 |  |  |
| Turbine oil+0.1% normal butyl ether of ortho tertiary butyl para cresol | 17 | 0.03 | 7 | 0.20 |  |  |
| Turbine oil+0.1% isopropyl ether of ortho tertiary butyl para cresol | 17 | 0.03 | 8 | 0.10 |  |  |
| Turbine oil+0.1% isobutyl ether of ortho tertiary butyl para cresol | 17 | 0.03 | 6 | 0.25 |  |  |
| Turbine oil+0.1% secondary butyl ether of ortho tertiary butyl para cresol | 17 | 0.03 | 9 | 0.08 | 5 | 0.40 |

From the above data it is apparent that the above substances do not materially aid the quality of the petroleum oil.

It is to be understood that although the substances of the present invention are particularly adapted for improving the quality of petroleum lubricating oils, they likewise may be employed for the stabilization of petroleum hydrocarbons generally against oxidation, deterioration, and the like, as for example, for the stabilization of petrolatums, petroleum waxes, motor fuels, and the like, as well as for the stabilization of various vegetable and animal oils.

The process of the present invention is not to be limited by any theory or mode of operation; but only in and by the following claims in which it is desired to claim all novelty in so far as the prior art permits.

We claim:

1. Composition comprising an oil and a small amount of a substance selected from the class of tertiary alkyl aromatic mono-ethers which are characterized by having at least two alkyl groups attached directly to the aromatic nucleus, one of which is a tertiary alkyl group and the other of which is an alkyl group containing at least two carbon atoms in the molecule.

2. Composition comprising a petroleum hydrocarbon and a small amount of a substance selected from the class of tertiary alkyl aromatic mono-ethers which are characterized by having at least two alkyl groups attached directly to the aromatic nucleus, one of which is a tertiary alkyl group and the other of which is an alkyl group containing at least two carbon atoms in the molecule.

3. Composition in accordance with claim 2 in which the tertiary alkyl groups contain from four to five carbon atoms in the molecule.

4. Composition in accordance with claim 2 in which the alkyl groups contain from four to five carbon atoms in the molecule.

5. Composition in accordance with claim 2 in which said substance is tertiary butyl ether of ortho tertiary butyl para ethyl phenol.

6. Composition in accordance with claim 2 in which said substance is tertiary butyl ether of ortho tertiary butyl para normal butyl phenol.

7. Composition in accordance with claim 2 in which said substance is tertiary butyl ether of ortho tertiary butyl para normal hexyl phenol.

8. Oil composition having a high resistance against oxidation comprising a petroleum oil boiling in the lubricating oil range and a small amount of a substance selected from the class of tertiary alkyl aromatic mono-ethers which are characterized by having at least two alkyl groups attached directly to the aromatic nucleus, one of which is a tertiary alkyl group and the other of which is an alkyl group containing at least two carbon atoms in the molecule.

JONES I. WASSON.
WARREN M. SMITH.